(No Model.)
C. S. KERSHAW.
HOISTING AND CONVEYING APPARATUS.
No. 244,061. Patented July 12, 1881.
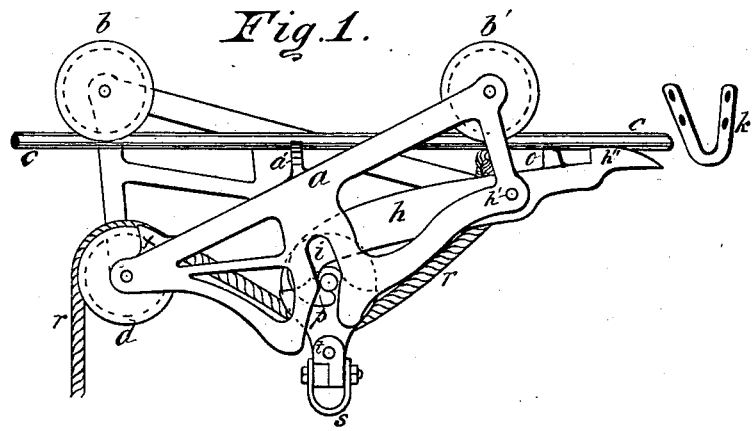
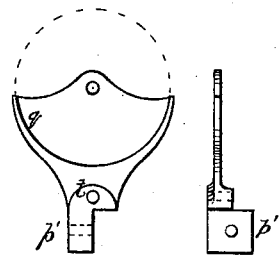
Witnesses:
Will. H. Davis
John Smith
Inventor:
C. S. Kershaw
by J. H. Greenough
Atty

UNITED STATES PATENT OFFICE.

CHARLES S. KERSHAW, OF SHERBURNE, NEW YORK.

HOISTING AND CONVEYING APPARATUS.

SPECIFICATION forming part of Letters Patent No. 244,061, dated July 12, 1881.

Application filed May 14, 1881. (No model.)

*To all whom it may concern:*

Be it known that I, CHARLES S. KERSHAW, of Sherburne, in the county of Chenango and State of New York, have invented certain new and useful Improvements in Hoisting and Conveying Machines, the following being a description thereof with reference to the accompanying drawings, in which—

Figure 1 is a side elevation of the machine complete. Fig. 2 shows the catch-hook $h$ detached; Fig. 3, the inside of the shell-plate of pulley-block $p$.

The frame of the carriage $a$, with its supporting-rollers $b\ b'$, are like those of my former patent, dated May 1, 1877, No. 190,337, upon which this is an improvement, the hooks for holding the frame on the traversing rod being omitted and other devices added, as hereinafter set forth.

The rollers $b\ b$, being attached to opposite sides of the frame by a stud on which they turn, permit the carriage to be put on or taken off the carrying or traverse rod $c$ on which it runs without hooking or unhooking; and to prevent the roller $b$ from jumping the track $c$ I project upward from the frame a guard or boss, $a'$, that will guard it from such an accident.

There is a bifurcated horizontal hook, $h$, pivoted in the frame at $h'$. When this hook is in the position shown in Fig. 1 it hooks onto and holds the pulley-block $p$, as hereinafter described. At the end opposite the hooks there is a catch, $h''$, that engages a stationary rest, $k$, when brought into contact with it, in which act the catch is depressed and the hooks thrown up, releasing the pulley-block $p$, which drops out of the slots $i$ formed in the carriage-frame to receive the projecting journals of the sheave of the pulley-block $p$.

The shell of the pulley-block $p$ consists of two side plates, the inner face of one of which is shown at Fig. 3, the two sides being cast from one pattern. The joints $p'$ lap by each other, and are united by a bolt that passes through a hole in them and through the ends of a clevis, $s$. (Clearly seen in Fig. 1.) Another hole, $t$, is made through the parts of this joint at right angles to the one first named, through which the bolt may be put which secures the clevis to the pulley-block at right angles to its position in Fig. 1. This change of position is sometimes found very desirable in practice.

On the inner face of the shell, Fig. 3, there is a circular recess, $q$, sufficient to act as a guard to prevent the rope $r$ from riding over the edge of the sheave and chafing. A similar guard, $x$, Fig. 1, is placed on the frame of the carriage to shield the rope $r$ in passing over the lifting-pulley $d$.

The sheave of the pulley-block $p$ has an elongated journal affixed to it permanently, that projects through the cheeks of the block far enough to enter and slide up into the slot $i$, (see Fig. 1,) where it is caught and retained by the hook $h$, as before stated, until it is relieved by the catch $h''$ striking the rest $k$, which allows the pulley-block $p$ to descend.

The end of rope $r$ is put through a hole, $h^3$, (see Fig. 2,) and fastened between the fulcrum $h'$ and the bifurcated hooks, which tends to draw and hold them down to insure the catching upon the journals of the pulley-block. The rope runs thence down around the sheave of the pulley-block $p$, and up over the lifting-pulley $d$, before named.

On the side of the shank of the hook $h$, between its fulcrum and catch $h''$, there is a projection, $o$, that serves to guide and hold the roller $b'$ of the carriage on the rod $c$. When the carriage is to be taken off of the rod $c$ the catch $h''$ is depressed until the projection $o$ clears the rod, so that by turning the carriage sidewise the roller $b'$ is lifted from rod $c$, and the other roller, $b$, is readily freed therefrom to remove the carriage.

Having thus fully described my new improvements in hoisting and conveying machines, I claim—

1. The hook $h$, in combination with the slot $i$ in the frame of the carriage $a$, and the elongated journals of pulley-block $p$, substantially as and for the purposes specified.

2. The arrangement of the plates or cheeks of the pulley-block $p$, so united at $p'$ as to be fastened by a single bolt that can be passed through holes in them in either of two directions at right angles to each other, as described, so as to attach the clevis s in either position.

3. The recess q in the inner face of the pulley-block cheeks, and the guard x over pulley d, to cover the ends of the sheaves, as and for the purposes specified.

4. The boss a' on the frame of the carriage, and projection o on hook h, to guide and retain the carriage-rollers b b' on the rod c, as specified.

CHARLES S. KERSHAW.

Witnesses:
J. J. GREENOUGH,
W. H. DAVIS.